Figure 1:
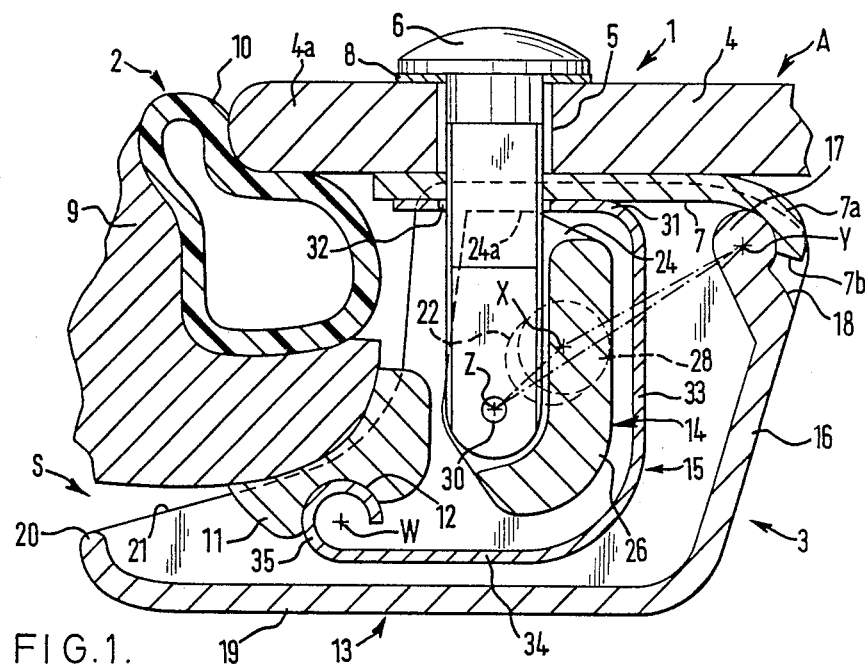

United States Patent [19]
Frampton et al.

[11] Patent Number: 4,573,735
[45] Date of Patent: Mar. 4, 1986

[54] HINGE ASSEMBLY

[75] Inventors: Jeffery A. Frampton, Begnins, Switzerland; Nicholas Bartman, Aylesbury, England

[73] Assignee: Idex (Jersey) Limited, Channel Islands

[21] Appl. No.: 577,865

[22] Filed: Feb. 7, 1984

[51] Int. Cl.⁴ .............................................. B60J 7/18
[52] U.S. Cl. ........................................ 296/218; 49/465
[58] Field of Search ...................... 296/218, 216, 224; 49/465, 463; 292/263, DIG. 49

[56] References Cited

U.S. PATENT DOCUMENTS

| | | | |
|---|---|---|---|
| 4,154,474 | 5/1979 | Hough et al. | 296/218 |
| 4,205,875 | 6/1980 | Smith | 296/218 |
| 4,231,609 | 11/1980 | Sorensen | 296/218 |
| 4,364,600 | 12/1982 | Hauber | 296/218 |
| 4,428,155 | 1/1984 | Kwan et al. | 49/465 |
| 4,484,773 | 11/1984 | Lehne | 292/263 |

*Primary Examiner*—Robert R. Song
*Attorney, Agent, or Firm*—Webb, Burden, Robinson & Webb

[57] ABSTRACT

A hinge assembly for a sunroof panel having its effective transverse pivot axis slightly rearward of the vertical plane containing the front edge of the panel to minimize compressive wear on the elastomer panel seal when the panel is closed. A U-shaped channel secured to the panel having a rounded forward edge fitting into a groove and held therein by the elasticity of the elastomeric seal and the channel. A protective cowl surrounding the channel and capable of being pivoted about a pivot axis by a finger pull to affect the contact of the channel with the panel so that the channel falls downwardly to allow the hinge assembly to open to raise the panel.

7 Claims, 4 Drawing Figures

HINGE ASSEMBLY

This invention relates to a hinge assembly, and more particularly to a hinge assembly suitable for pivoting at or near one edge a flap lying effectively flush with a surrounding surface. The invention is of particular applicability to a hinge assembly used on a vehicle sunroof.

In a preferred form the invention relates to such a hinge assembly which is readily demountable for maintenance or replacement.

Although this invention has general applicability to a hinge for any pivoted flap more or less plane with its surround, it will be generally described in relation to a vehicle sunroof of the tilting type. In such sunroofs the flap is a pane of toughened glass and lies more or less flush with or slightly above the roof panel of the vehicle. Such a pane is tilted up at the rear edge about a transverse pivot axis in the vicinity of the front edge. Because of its position such a sunroof has to be adequately sealed into a surround fitted in the roof panel of the vehicle. Typical seals are made of a tubular elastomeric member which flexes as the flap moves.

A problem of such flaps which we have observed is that the seal at the front edge of the sunroof becomes unduly worn in use. This is because conventionally the effective pivot axis is spaced to some distance back from the front edge of the glass. If, for example, it is spaced so as to lie rearwardly one tenth of the distance from the front edge towards the back edge of the glass, an effective opening at the rear edge of say fifteen centimeters will lead to the forward edge being lowered by 1.5 centimeters. This amount of movement upon a rubber seal in a position exposed to weather is undesirable, and can lead to failure of the seal. Attempts to overcome this problem have included roof mountings, in which the hinges are above the roof panel, but these attempts are unattractive and have led to different disadvantages such as rust, corrosion or accumulation of dirt. A third type of fixture, the so-called "bayonet" fixture using arcuate struts gives rise to wind noise when opened.

In one aspect the present invention sets out to provide a suitable hinge assembly, the effective transverse pivot axis of which is only slightly rearward of the vertical plane containing the front edge of the flap, and is preferably ahead of the vertical plane containing the point of attachment of the hinge assembly to the flap.

A preferred form of the invention uses such an assembly to deal with another problem observable in sunroofs. If the hinge mechanism is inside of the vehicle it provides moving and working parts at a undesirable location, i.e. just above the head of the driver and/or passenger There is thus the risk of injury, or at least damage or marking, from the moving parts, especially when the sunroof is raised and these parts are in a more prominent position. In another aspect, the invention therefore provides a forward-positioned hinged structure as discussed above with a protective cowl. This cowl itself can be movable, so as to facilitate demounting of the hinge for service or replacement.

In one aspect the invention provides a hinge structure, for a vehicle sunroof or the like, in which a rounded transverse member fixed in relation to the sunroof flap or pane of glass is received in a downwardly open transverse groove or like configuration to constitute a transverse pivot axis located in a vertical plane at or near the vertical plane of the edge of the glass.

The converse arrangement, in which the grooved member is fixed in relation to the flap or pane of glass, is also within the scope of the invention. Moreover, other types of transverse axes at or near the forward edge of the glass or the like can be utilized.

In another aspect the invention consists in a hinge structure, for a vehicle sunroof or the like, of the type in which a forward edge of the flap or pane of glass rests upon a deformable seal extending transversely of the vehicle, in which a forwardly open generally rigid channel-shaped frame is secured to extend transversely beneath the glass or like flap near a forward edge thereof, a lower wall of the channel-shaped frame having a rounded configuration whereby it is adapted to be received into a transverse groove of like configuration to a static vehicle component beneath the seal so that the rubber seal is clamped between the glass and the static vehicle component and the effective transverse pivot axis defined at the rounded edge is located in a vertical plane at or near the vertical plane of the edge of the glass.

The frame member may be made of polymer or metal and advantageously is itself of a spring or clamping construction. Spring steel or heavy-duty polymer moulding, e.g. of neutral opening dimension rather less than the assembled opening dimension, is preferred. A positive clamping action is exerted by such a spring member, in addition to the clamping action produced by deformation of the rubber seal. In this way, even after prolonged use (when the resilience of the rubber may decrease and the rubber becomes permanently deformed) there is a positive axis at the front edge of the sunroof, which can however still be overcome by a strong disassembling pull in accordance with the main invention.

By "static vehicle component" we mean a vehicle roof structure, or more usually a sunroof surround frame, which does not alter its position relative to the remainer of the vehicle. Preferably, the effective transverse axis is located between the vertical plane of the edge of the flap or glass and the vertical plane containing the point of attachment of the channel to the flap or glass.

Thus, in the invention as defined above, the necessary connection between the flap or glass pane and the static vehicle component is effected by squeezing the rubber seal between the edge of the glass and the underlying vehicle component. The rounded hinging edge extends as a transverse pivot axis which lies within the vehicle, below the flap or glass and in a forward position at or near the vertical plane of the front edge of the flap or glass so as to minimise deformation of the seal upon tiling of the flap or glass.

Preferably, the moving portions so defined are covered by a protective cowl, for example of a rounded configuration. This cowl itself may be capable of relative movement.

In a particularly preferred embodiment, the cowl member has side walls, extending longitudinally in relation to the vehicle, and defining on their inner surfaces bearing means; and a clamping yoke is supported in the bearing means and capable of pressing the channel-shaped frame into immobilised engagement with respect to the flap or pane of glass, the yoke being capable of a pivoting movement in the bearing means so that it becomes removed from its engaged position and the channel-shaped frame consequently tilts to disengage the rounded forward edge from the transverse groove in the static vehicle component.

In a preferred form the bearing means are shaped as elliptical recesses at the inner surface of each yoke side wall, and circular bearing members project one from either side of the yoke to be mounted in such recesses. In such a case the yoke positions may force the circular bearing members (a) to uppermost positions in their respective elliptical recesses at which the centre of the bearing member is above a line joining (i) a transverse pivot axis between the yoke and a securing member to the flap or pane and (ii) the pivot point of the cowl relative to the flap or pane or (b) to lowermost positions in which the said centre is at the other side of the said line.

Figure 2:
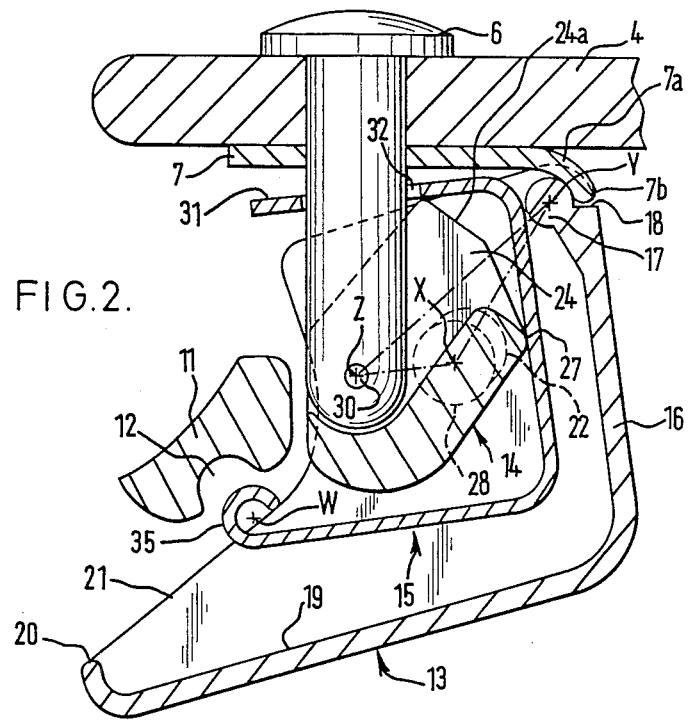
Figure 3:
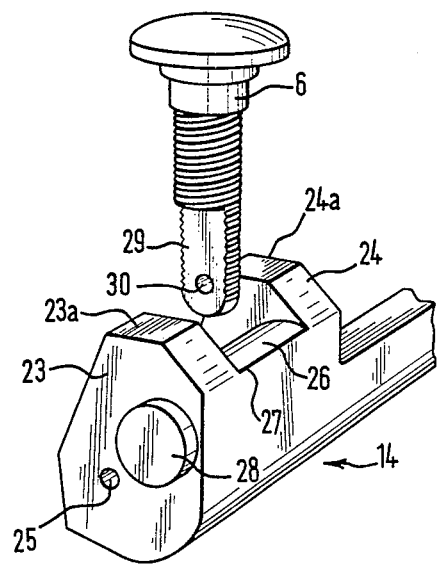
Figure 4:
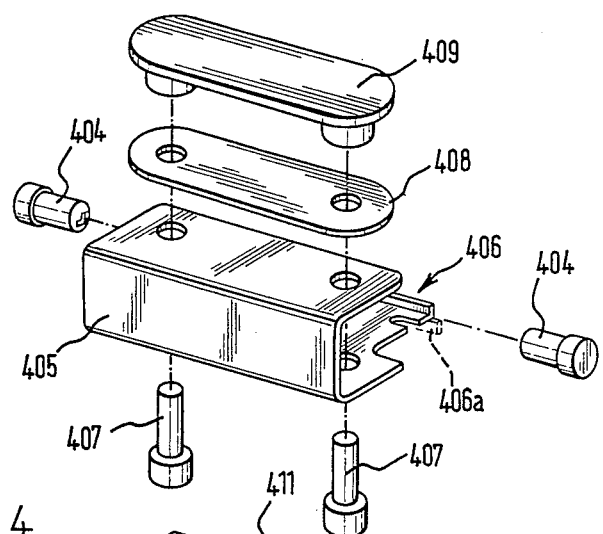
Figure 4:
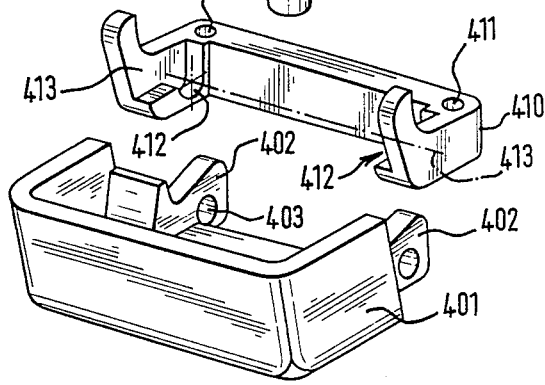

The invention will be further described with reference to the accompanying drawings, in which:

FIG. 1 is a longitudinal section through a demountable hinge according to the invention in use on a vehicle sunroof, FIG. 2 is a simplified diagrammatic section showing parts of FIG. 1 in their relative positions as the hinge is de-mounted, FIG. 3 shows in exploded perspective part of FIGS. 1 and 2, and FIG. 4 shows a different design of hinge in exploded view, also permitting pivoting near the front edge.

The assembly shown in the FIGS. 1 and 2 comprises a sunroof portion 1, a static vehicle component in the form of a surround 2, and a hinge structure 3 which in addition to permitting the sunroof to pivot upwards can also be readily de-mounted to remove the sunroof.

The sunroof portion 1 comprises a pane of toughened glass 4 apertured at 5. A metal or polymer flap can also be used and references to "pane of glass" herein should be read accordingly. A bolt 6 of specialised form described below, passes freely through the aperture but in threaded connection with steel plate 7, and packing 8 is located between the head of the bolt and the upper surface of the glass. Thus the glass 4 is attached to the steel plate 7.

The surround 2 comprises a transverse structural member 9 supporting a tubular rubber seal 10 immediately beneath the front edge 4a of the glass. Beneath the structural member 9, (which can be of any convenient shape and point of attachment to the vehicle roof) is located a strip 11, suitably of synthetic polymer, with a groove 12, part-circular in cross-section, along its lower surface i.e. extending transversely in relation to the vehicle.

The hinge structure 3 is shown in a longitudinal section including one bolt. Usually there are two bolts, spaced transversely, in each hinge, and preferably there are two such hinges for each sunroof. Each hinge structure 3 comprises a cowl or housing 13, a transverse yoke 14 and a pivot-carrying frame or channel 15.

The cowl 13 is an integral structure of polymeric material. It possesses a rear wall 16 with a rounded upper edge 17 lodged in a curved rear edge configuration 7a of steel plate 7, and possessing an abutment surface 18 near this upper edge 17. It further possesses base 19 with rounded finger-grip edge 20, and moreover side walls 21 on the inner opposed faces of which are formed two elliptical bearing recesses 22.

Transverse yoke 14 is also shown in FIG. 3. For each bolt position the yoke 14 possesses two parallel walls 23 and 24 with aligned apertures 25 towards their lower ends. A rear yoke wall 26 possesses an obtuse corner region 27. Walls 23 and 24 have upper clamping surfaces 23a and 24a respectively. The outer face of wall 23 and its opposite counterpart wall at the other end of the yoke (not shown) are formed to provide short large diameter bearing member 28. FIG. 3 also shows the nature of bolt 6, which has a conventional threaded configuration where it needs to engage the plate 7 but a cut-away flat lower half 29 containing a through hole 30.

Pivot-carrying frame 15 is preferably of metal. It has a flat top 31 with an oversize hole 32 surrounding bolt 6. It also possesses rear wall 33 and bottom wall 34, the front edge of which is rounded at 35 to provide an almost completely circular cross-section of a size to sit in groove 12 of strip 11.

Assembly is effected by turning bolt 6 in steel plate 7 until the glass 4 is gripped between plate 7 and resilient packing 8. The dimensions are predetermined so that bolt 6 then extends the requisite distance beneath the steel plate. The resilience of the packing 8 allows the bolt 6 to be adjusted so that through hole 30 aligns with apertures 25. At this stage, a shaft is passed through aligned apertures 25 and yoke 14 is thus connected to the bolt and is able to clamp, at surfaces 23a and 24a, the underside of the plate 7 to the top 31 of frame or channel 15 so that the frame or channel is immobilized against the plate 7. The rounded front pivot edge 35 of the frame lodges firmly in groove 12. Simultaneously, bearing members 28 at each end of the yoke slide up the elliptical bearing recesses 22 in the inner faces of cowl side walls 21 to a position where the joint centre of rotation X is above a line joining the pivot axis Z (at 25, 30) and the axis Y at the rounded upper edge 17 of cowl rear wall 16 which is lodged in curved rear edge configuration 7a of plate 7. This "over-centre" effect holds the cowl in a closed protective position over the moving parts.

Use of the hinge involves pivoting around the axis W, formed by edge 35 turning in groove 12. The vertical plane containing axis W lies just rearward of the vertical plane containing the edge 4a of the glass, and forward of the vertical plane of the axes of the bolts.

This forward and underneath location of the sunroof pivot axis is advantageous over the prior art. One form of prior art involves hinges above the glass surface, with consequent risk of rust, damage and dirt. Another prior art hinge structure involves the effective hinge point being too far rearward of the edge 4a (e.g. at about point A) whereby edge 4a moves excessively when the roof open and gives only a short operating life to the seal 10. The present invention gives a pivot location well forward in relation to the sunroof so as to minimise the wear on the seal. Moreover, in its improved form shown in the drawings, the hinge is safely mounted inside the car (i.e. with all moving parts covered in normal use) but is readily demountable for complete ventilation or for servicing or replacement if necessary.

De-mounting and removing the hinge is best described with reference to FIG. 2. The operator places his finger is space S and pulls down hard on edge 20. The resilience in the structure (e.g. at 8 or inherent in the polymer components) allows the cowl to turn around pivot axis Y, the operator thus overcoming the "over-centre" resistance of axis X and pulling this axis into a new relationship, shown in FIG. 2, under the line Y-Z with the bearing members 28 in the lower ends of bearing recesses 22 and with cowl abutment surface 18 against rear plate edge 7b. This pulls yoke 14 backwards, so that its surfaces 23a and 24a no longer clamp frame 15. However, hole 32 is oversized in relation to bolt 6. Frame 15 therefore falls downwards and edge 35 falls out of groove 12 to enable removal of the whole hinge structure and associated pane of glass. Mounting the assembled sunroof/hinge preassembly can of course take place in the reverse order.

FIG. 4 shows a simplified design, which illustrates an alternative embodiment of the "forward pivoting" aspect of the invention, prior to assembly.

A moulded polymer outer casing 401 has forwardly extendingly lugs 402 with aligned apertures 403. Polymer pins 404 pass one through each aperture. Spring steel channel 405 pivots at its forward edge 406 around these pins, being turned over as at 406a for this purpose. This channel normally lies inside casing 401, facing forward. Fixing bolts 407 pass through the channel, through attachment plate 408 and through corresponding holes in a glass pane (not shown) to terminate in end yoke 409, this fixing being achieved by tilting casing 401 forward away from channel 405 prior to assembly.

Attachment to the surround frame of the roof (not shown) is achieved by stationary crosspiece 410, fixed at bores 411 by suitable screws (not shown). The pins 404, at their projecting heads, ride in arcuate recesses 412 of backwardly and upwardly extending crosspiece arms 413, thus giving a forward pivot axis. Spring steel channel 405 grips the elastomer seal on the surround in a positive fashion.

We claim:

1. In a motor vehicle sunroof having a panel member and a peripheral elastomeric seal upon which the edge of said panel member seats and the improvement comprising a hinge structure attached at the forward edge of said panel member, said hinge structure comprising a channel lying in a horizontal plane below said panel member and having an upper wall and a lower wall substantially parallel to said upper wall and spaced from said upper wall to define therebetween a U-shaped opening facing forwardly of said panel member, attachment means attaching said upper wall of said channel to said panel member with said lower wall of said channel extending forwardly beneath the forward portion of said elastomeric seal, a horizontally extending location strip attached to the sunroof beneath the forward portion of said elastomeric seal, said location strip having a downwardly opening groove with a substantially arcuate cross-section extending along its lower surface, and a rounded formation formed on the forward edge of said lower wall of said channel for location in said groove to form a pivot axis for said channel located beneath the forward edge of said elastomeric seal and forwardly of said attachment means between said upper wall of said channel and said panel member.

2. Apparatus as set forth in claim 1 wherein said channel is a resilient member, whereby said channel exerts a positive clamping action on the forward portion of said elastomeric seal when said rounded formation on the forward edge of the lower wall of said channel is located in said groove.

3. Apparatus as set forth in claim 1 including a protective cowl substantially surrounding said channel.

4. Apparatus as set forth in claim 3 wherein said cowl comprises a pair of spaced substantially parallel side walls extending longitudinally of the vehicle sunroof, bearing means formed on the inner surface of each of said side walls, a clamping yoke pivotally supported between said bearing means and located within said channel, whereby said yoke is pivotable between an upper position in which said upper wall of said channel is pressed by the yoke into immobilized engagement with said panel member and a lower position wherein said upper wall of said channel falls away from engagement with said panel member so that said rounded formation on the forward edge of said lower wall falls out of said groove in said location strip to permit disengagement of said panel member and said elastomeric strip.

5. Apparatus as set forth in claim 4 including means passing horizontally through said attachment means within said channel forming a pivot axis for said clamping yoke.

6. Apparatus as set forth in claim 5 including means located at the rear of said cowl forming a transverse horizontal pivot axis for said cowl.

7. Apparatus as set forth in claim 6 including opposed elliptical recesses in the inner surface of each cowl side wall, a cylindrical protrusion projecting from each end of said clamping yoke to lie in an elliptical recess in either a lower position or an upper position in relation to the elliptical shape of the recesses, whereby the center line of the cylindrical protrusions in the lower position and the upper position in said elliptical recesses lies on opposite sides of a line joining the cowl pivot axis and the yoke pivot axis so that said cowl can only be opened or closed by an over-center pressure.

* * * * *